(12) United States Patent
Zaid et al.

(10) Patent No.: US 12,384,545 B2
(45) Date of Patent: Aug. 12, 2025

(54) AIRFOIL OF AN AIRCRAFT, AIRCRAFT WITH AN ICE PROTECTION SYSTEM AND METHOD OF ICE PROTECTING THE AIRFOIL

(71) Applicant: Lilium eAircraft GmbH, Wessling (DE)

(72) Inventors: Ayaz Janjua Zaid, Gilching (DE); Matthias Haisch, Seefeld (DE)

(73) Assignee: Lilium eAircraft GmbH, Wessling (DE)

( * ) Notice: Subject to any disclaimer, the term of this patent is extended or adjusted under 35 U.S.C. 154(b) by 0 days.

(21) Appl. No.: 18/165,670

(22) Filed: Feb. 7, 2023

(65) Prior Publication Data

US 2023/0249833 A1 Aug. 10, 2023

(30) Foreign Application Priority Data

Feb. 9, 2022 (EP) ..................................... 22155865

(51) Int. Cl.
*B64D 15/08* (2006.01)
*B64C 29/00* (2006.01)
*B64C 39/12* (2006.01)
*B64D 27/34* (2024.01)
*B64D 27/31* (2024.01)

(52) U.S. Cl.
CPC .......... *B64D 15/08* (2013.01); *B64C 29/0008* (2013.01); *B64C 39/12* (2013.01); *B64D 27/34* (2024.01); *B64D 27/31* (2024.01)

(58) Field of Classification Search
CPC ....... B64C 3/00; B64C 29/0008; B64C 39/12; B64D 15/16; B64D 15/08
See application file for complete search history.

(56) References Cited

U.S. PATENT DOCUMENTS

| 10,696,412 | B2 | 6/2020 | Mackin |
| 10,737,792 | B2 | 8/2020 | Mackin |
| 10,850,832 | B2 * | 12/2020 | González ................. B64C 3/14 |
| 2008/0175987 | A1 * | 7/2008 | Carter .................... B64D 15/08 427/155 |

(Continued)

OTHER PUBLICATIONS

European Extended Search Report for Application No. 22155865.3 dated Jul. 8, 2022, 5 pages.

*Primary Examiner* — Brady W Frazier
*Assistant Examiner* — Shanna Danielle Glover
(74) *Attorney, Agent, or Firm* — TraskBritt

(57) ABSTRACT

An airfoil of an aircraft with an ice protection system, the airfoil having a leading edge, the ice protection system comprising a first applying mechanism for applying an ice protection fluid along at least a portion of the leading edge of the airfoil, and an ice protection fluid recovering mechanism for recovering the ice protection fluid applied by the first applying mechanism, the ice protection fluid recovering mechanism being arranged downstream of the leading edge of the airfoil. The ice protection system further comprises a second applying mechanism for applying the ice protection fluid recovered by the ice protection fluid recovering mechanism on at least one area of the airfoil arranged downstream of the leading edge of the airfoil. An aircraft may comprise at least one airfoil provided with the ice protection system. A method may be used to protect the airfoil of an aircraft from ice accumulation.

15 Claims, 1 Drawing Sheet

(56) References Cited

U.S. PATENT DOCUMENTS

| | | | |
|---|---|---|---|
| 2011/0210211 A1* | 9/2011 | Zha | B64C 21/025 |
| | | | 416/91 |
| 2016/0311542 A1 | 10/2016 | Mackin | |
| 2018/0079511 A1 | 3/2018 | Mackin | |
| 2018/0079512 A1* | 3/2018 | Jackowski | G01S 7/497 |
| 2018/0305031 A1* | 10/2018 | Fahrner | D05B 93/00 |
| 2018/0334251 A1* | 11/2018 | Karem | B64C 13/18 |

* cited by examiner

AIRFOIL OF AN AIRCRAFT, AIRCRAFT WITH AN ICE PROTECTION SYSTEM AND METHOD OF ICE PROTECTING THE AIRFOIL

PRIORITY CLAIM

This application claims the benefit of the filing date of European Patent Application Serial No. 22155865.3, filed Feb. 9, 2022, for "AIRFOIL OF AN AIRCRAFT WITH AN ICE PROTECTION SYSTEM, AIRCRAFT WITH THE AIRFOIL AND METHOD OF ICE PROTECTING THE AIRFOIL," the disclosure of which is incorporated herein in its entirety by this reference.

TECHNICAL FIELD

The present patent disclosure refers to an airfoil of an aircraft with an ice protection system, the airfoil having a leading edge, the ice protection system comprising a first applying mechanism for applying an ice protection fluid along at least a portion of the leading edge of the airfoil, and an ice protection fluid recovering mechanism for recovering the ice protection fluid applied by the first applying mechanism, the ice protection fluid recovering mechanism being arranged downstream of the leading edge of the airfoil. Furthermore, the present patent disclosure also refers to an aircraft comprising at least one airfoil provided with the ice protection system and to a method of ice protecting an airfoil of an aircraft and/or an aircraft.

BACKGROUND

Ice protection systems can be based on different physical principles. Known ice protection systems use, for example, electrothermal heating, pneumatic/mechanical boots, bleed air systems or freezing point depressants. A freezing point depressant (FPD) ice protection system involves the use of a fluid such as ethylene glycol to lower the freezing point of water and ensure that ice does not form on the aircraft surfaces even at sub-zero atmospheric temperature conditions. This fluid is dispersed at the leading edge of the airfoil surface in icing conditions and flows back forming a film across the airfoil surface area.

U.S. Pat. No. 10,737,792 B2 discloses an anti-ice system for delivering ice protection or anti-ice fluid to an aerodynamic surface of the aircraft with an anti-ice system. The anti-ice fluid is a fluid that mixes with water, thereby lowering the freezing point of the water so that the water does not freeze. An example for an anti-ice fluid is a glycol-based fluid. The anti-ice system comprises a tank containing the anti-ice fluid and a conduit for connecting the tank with a porous panel on the aerodynamic surface of the aircraft. The anti-ice fluid is delivered from the tank through the conduit to the porous panel, exiting on the aerodynamic surface of the aircraft, for example, on a wing or an aircraft propeller, and forms a film across the aerodynamic surface. Apertures are arranged in a downstream region of the aircraft propeller or the wing for recovering at least some of the anti-ice fluid, which is then returned to the tank.

A similar system is shown in U.S. Pat. No. 10,696,412 B2. In this system, the anti-ice fluid is used for cooling electronic components before it is transferred to the porous panel where it leaks through the porous panel onto the aerodynamic surface.

Electrothermal ice protection systems or actively heated ice protection systems are also well known in the state of the art. A disadvantage of electrothermal ice protection systems is that they consume a significant amount of power. Ice protection systems using ice protection fluids, such as freezing point depressants, result in additional weight due to the fluid used for de-icing or anti-icing leading to reduced payload.

BRIEF SUMMARY

It is therefore the object of the present patent disclosure to provide an airfoil of an aircraft with an ice protection system that overcomes the disadvantages known from the state of the art, and that, in particular, leads to reduced power consumption and/or reduced weight.

This object is solved by an airfoil as described above, wherein the ice protection system further comprises a second applying mechanism for applying the ice protection fluid recovered by the ice protection fluid recovering mechanism on at least one area of the airfoil arranged downstream of the leading edge of the airfoil.

In icing conditions, the ice protection fluid is disposed at the leading edge of the airfoil the aircraft by the first applying mechanism and flows along the surface of the airfoil forming a film across the airfoil. After de-icing or anti-icing at least a portion of the leading edge of the airfoil of the aircraft, the ice protection fluid applied by the first applying mechanism is recovered or collected by the ice protection fluid recovering mechanism. The recovered ice protection fluid may also comprise water from de-icing/anti-icing the portion at the leading edge of the airfoil of the aircraft. The recovered or collected ice protection fluid is then transferred to further areas of the airfoil of the aircraft, which are arranged downstream of the leading edge of the airfoil of the aircraft, and is applied to these further areas of the airfoil of the aircraft by the second applying mechanism. As the ice protection fluid is first applied to the leading edge of the airfoil and then re-used on a further, downstream portion of the airfoil and/or the aircraft, the total amount of ice protection fluid needed by the ice protection system can be reduced. The aircraft only needs to be equipped with the amount of ice protection fluid necessary for de-icing the leading edge of airfoil, the further areas of the airfoil of the aircraft arranged downstream of the leading edge are ice protected with the recovered ice protection fluid. Therefore, the overall weight of the ice protection fluid can be reduced. Furthermore, the energy consumption of the ice protection system is reduced in comparison to the electrothermal ice protection. In the context of the present disclosure, an airfoil is any part of the aircraft that needs ice-protection in icing conditions, e.g., a wing, a canard, a motor or engine (the terms being used synonymously herein), motor or engine parts, landing gear, etc.

According to an embodiment of the present disclosure, the ice protection fluid recovering mechanism of the ice protection system can further comprise at least one recovery recess arranged in the surface of the airfoil downstream of the leading edge of the airfoil for recovering the ice protection fluid. The at least one recess can be formed as one continuous recess arranged on the surface of the airfoil or it can be composed of a plurality of adjacent smaller recesses. This leads to a simple design for allowing collection/recovery of the ice protection fluid after it has been applied to the leading edge of the airfoil of the aircraft.

According to a further embodiment, the recovery recess can comprise a cover that is open in icing conditions and that is closed in non-icing conditions so that it covers the recovery recess to be flush with the surrounding surface of the airfoil of the aircraft. This design minimizes the aerodynamic effects of the recess in flight in non-icing conditions.

According to a still further embodiment, the second applying mechanism comprises at least one pump for pumping the ice protection fluid recovered by the ice protection fluid recovering mechanism to the at least one area of the airfoil arranged downstream of the leading edge of the airfoil. This is an easy design to deliver the recovered ice protection fluid to downstream portions of the airfoil of the aircraft. The pump can be a mechanical pump.

In a further embodiment, the ice protection system is configured to work in an anti-icing mode and/or in a de-icing mode. In the anti-icing mode, the ice protection system is configured so that no ice is built up on the airfoil of the aircraft even at sub-zero atmospheric temperature conditions. The ice protection system prevents the incoming supercooled droplets from freezing as the ice protection fluid is reduced in viscosity for easier flow back along the airfoil with the addition of the incoming water droplets. The reduction in viscosity also makes it easier for the pump to move the fluid for protection of the areas arranged downstream of the leading edge of the airfoil, e.g., motor surfaces and spinner. In the de-icing mode, pre-formed ice on the airfoil is removed through the conversion of a thin ice layer on the airfoil, i.e., the airfoil surface, into water, leading to the remaining ice pieces being removed due to aerodynamic forces.

In yet a further embodiment, the ice protection fluid can comprise a freezing point depressant. The freezing point depressant lowers the freezing point of water and ensures that no ice is formed on the aircraft surface even at subzero atmospheric temperature conditions. The freezing point depressant can be a fluid such as ethylene glycol.

In yet a further embodiment, the concentration of the freezing point depressant in the ice protection fluid is adapted so that the ice protection fluid keeps its ice protection properties after having treated the at least one portion of the leading edge of the airfoil. During de-icing/anti-icing of at least one portion of the leading edge of the airfoil, the ice protection fluid is diluted with the incoming water droplets or the produced melting water. As the initial concentration of the freezing point depressant is adapted to compensate for this dilution, the concentration of the freezing point depressant in the recovered ice protection fluid is sufficiently high so that the areas of the airfoil arranged downstream of the leading edge can also be securely de-iced/anti-iced.

In another preferred embodiment, the airfoil further comprises at least one motor arranged at the trailing edge thereof, wherein the first applying mechanism is configured to apply the ice protection fluid along at least a portion of the leading edge of the airfoil, the ice protection fluid recovery mechanism is arranged on the airfoil downstream of its leading edge and the second applying mechanism applies the ice protection fluid, that is recovered by the ice protection fluid recovering mechanism, along at least a portion of the leading edges of the at least one motor that is arranged on the respective airfoil. In this embodiment, the motors arranged on the trailing edge of the airfoil are the area of the airfoil arranged downstream of the leading edge. Due to the reusing of the ice protection fluid on downstream portions of the airfoil, namely the motor arranged on the trailing edge of the airfoil, it is possible to reduce the total amount of ice protection fluid needed. The fluid requirements only need to be sized for the leading edge of the airfoil. This leads to a reduction of the weight of the necessary ice protection fluid and thereby to an increase of payload. Furthermore, the energy consumption in comparison to electrothermal based activity heated ice protection systems can be reduced.

According to yet a further embodiment of the present disclosure, each motor can comprise a spinner and a rotor, and the second applying mechanism is configured to distribute the ice protection fluid recovered by the ice protection fluid recovery mechanism onto the spinner and the spinner is configured to spread the ice protection fluid onto the rotor. In this embodiment, the spinner and the rotor are also part of the area of the airfoil arranged downstream of the leading edge. This embodiment leads to a simple design, as only the spinner needs to be provided with means for applying the ice protection fluid and the centrifugal force of the spinner leads to spreading the ice protection fluid over itself and the rotor to keep the surfaces ice-free.

In yet a further embodiment, the second applying mechanism is configured to apply a constant flow of ice protection fluid to the spinner. Due to this design, no inter-cycle ice accretion occurs on the spinner and the rotor when the ice protection system is working and concerns about ice thickness effects on the aerodynamics of the rotor blades are avoided.

In yet a further embodiment, each motor can comprise a motor flap and a bulkhead and the second applying mechanism is configured to distribute the recovered ice protection fluid onto at least a portion of the motor flap and the bulkhead of each motor. In this embodiment, the motor flap and the bulkhead are also part of the area of the airfoil arranged downstream of the leading edge of the ice-susceptible portion. The second applying mechanism preferably applies the recovered ice protection fluid onto the leading edge of the motor flap and onto the leading edge of the bulkhead. This leads to a reliable de-icing of all ice-susceptible portions of the motors.

Furthermore, the present disclosure also refers to an aircraft comprising at least one airfoil as described above. Due to the reusing of the ice protection fluid on downstream portions of the airfoil, it is possible to reduce the total amount of ice protection fluid needed. The fluid requirements only need to be sized for the leading edge of the airfoil. This leads to a reduction of the weight of the necessary ice protection fluid and thereby to an increase of payload. Furthermore, the energy consumption in comparison to electrothermal based activity heated ice protection systems can be reduced.

In yet a further embodiment, the aircraft comprises at least two airfoils as described above, the airfoils being in the form of a pair of wings and/or in the form of a pair of canards As outlined above, reusing the ice protection fluid on downstream portions of the canard, namely the motor arranged on the trailing edge of the canard, leads to a reduction of the total amount of ice protection fluid needed. The fluid requirements only need to be sized for the leading edge of the wings and of the canards. This leads to an increase of payload. Furthermore, the energy consumption in comparison to electrothermal based activity heated ice protection systems can be reduced.

In yet a further embodiment of the present disclosure, the aircraft is an electric takeoff and landing aircraft (eVTOL). Additional energy consumption is a critical feature for eVTOLs. As the eVTOL, according to the present disclosure, is provided with an ice protection system using a fluid point depressant, a drastic reduction in overall power requirements is achieved compared to the electrothermal heating. Furthermore, as the fluid requirements only need to be sized for the leading edges of the wings and the canards, weight reduction of the fluid protection system and an increase of payload are achieved. Furthermore, as leading edge protection is limited to the stagnation zone, it does not interfere with the forward spar of the wing.

The present disclosure also refers to a method of ice-protecting an airfoil of an aircraft such as the airfoil and aircraft described above, the method comprising the following steps:

applying an ice protection fluid on a leading edge of the airfoil;

recovering the ice protection fluid downstream of the leading edge of the airfoil.

BRIEF DESCRIPTION OF THE DRAWINGS

Further advantages and details of the present disclosure can be taken from the following description of the figures, which show the following.

DETAILED DESCRIPTION

As outlined above, the object of the present disclosure is to provide a method for ice-protecting an airfoil of an aircraft from ice build-up, which overcomes the disadvantages known from the state of the art, and which, in particular, leads to reduced power consumption and/or reduced weight.

This object is solved by a method further comprising the step of distributing the recovered ice protection fluid on at least an area of the airfoil arranged downstream from the leading edge of the airfoil.

The ice protection fluid is disposed by the first applying mechanism at the leading edge of the airfoil of the aircraft, for example, the airfoil surface, in icing conditions and flows back forming a film across the airfoil. After de-icing or anti-icing at least a portion of the leading edge of the airfoil of the aircraft, the ice protection fluid applied by the first applying mechanism is recovered or collected by the ice protection fluid recovering mechanism. The recovered ice protection fluid may also comprise water from de-icing/anti-icing the portion at the leading edge of the airfoil of the aircraft. The recovered or collected ice protection fluid is then transferred to further areas of the airfoil of the aircraft, which are arranged downstream of the leading edge of the airfoil of the aircraft and is applied to these further areas of the airfoil of the aircraft by the second applying mechanism. As the ice protection fluid is first applied on the leading edge of the airfoil land then re-used on a further, downstream portion of the aircraft, the total amount of ice protection fluid needed by the ice protection system can be reduced. The aircraft only needs to be equipped with the amount of ice protection fluid necessary for de-icing the leading edge of the airfoil, the further areas of the airfoil of the aircraft are arranged downstream of the leading edge are ice-protected with the recovered ice protection fluid. Therefore, the overall weight of the ice protection fluid can be reduced. Furthermore, the energy consumption of the ice protection system is reduced in comparison with electrothermal ice protection.

Figure 1:
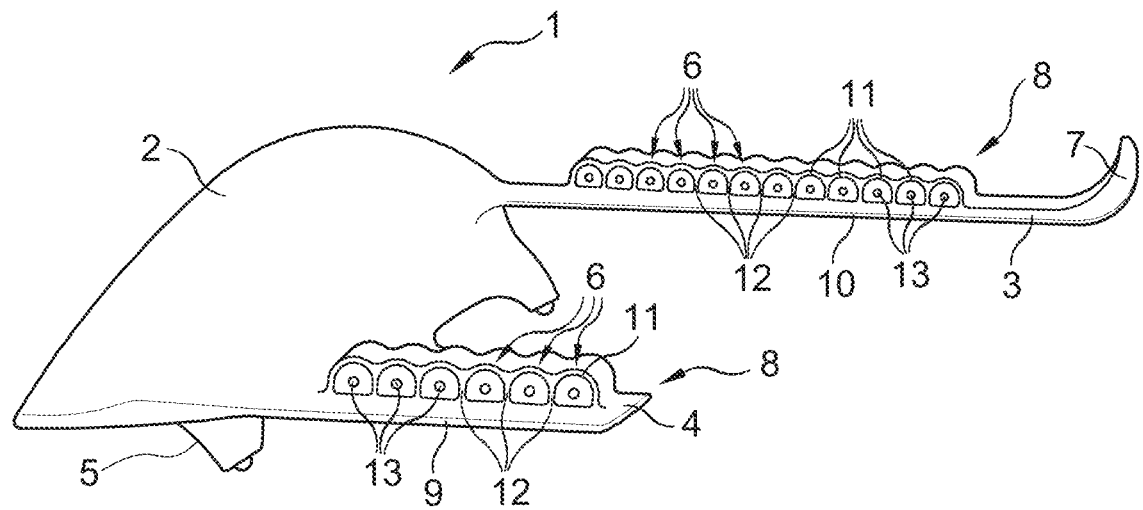
FIG. 1 Aircraft with an ice protection system arranged on airfoils thereof.

FIG. 1 shows a perspective view of parts of an aircraft 1. The aircraft 1 is preferably an electrical takeoff and landing aircraft, in short eVTOL. The aircraft 1 is electrically operated, the advantages of which lead to reduced emission of noise and exhaust gases, leading to a reduction of air and noise pollution.

The aircraft 1 comprises an aircraft body 2, a pair of wings 3 attached to the aircraft body 2 and a pair of canards 4, which are also attached to the aircraft body 2. In FIG. 1, only one of the canards 4 and only one of the wings 3 is shown. The other canard/wing is arranged symmetrically to the first canard 4/wing 3 on the other side of the aircraft body 2. At least one motor 6 is arranged on the trailing edge of each wing 3 and on the trailing edge of each canard 4. In the embodiment shown in FIG. 1, six motors 6 are arranged on the trailing edge of each canard 4 and twelve motors 6 are arranged on the trailing edge of each wing 3. At the tip of each wing 3, a winglet 7 is arranged. The aircraft 1 is further equipped with landing gear 5. The number of motors arranged on each wing/each canard is not limiting. It is thus also possible to arrange more or less motors on each wing/each canard.

The airfoils of the aircraft 1, in particular, all portions of the surface of the aircraft 1, where ice formations are expected to form during flight in icing conditions, can be provided with an ice protection system 8. Therefore, the ice protection system 8 can be arranged on the leading edge 9 of each canard 4, on the leading edge 10 of each wing 3 and on the leading edges of the motors 6. The leading edges of the motors 6 are the motor inlet upper lip, called motor flap 11 in the following, the motor bulkhead 12 and the spinner 13, as well as, the rotor of each motor 6.

Figure 2:
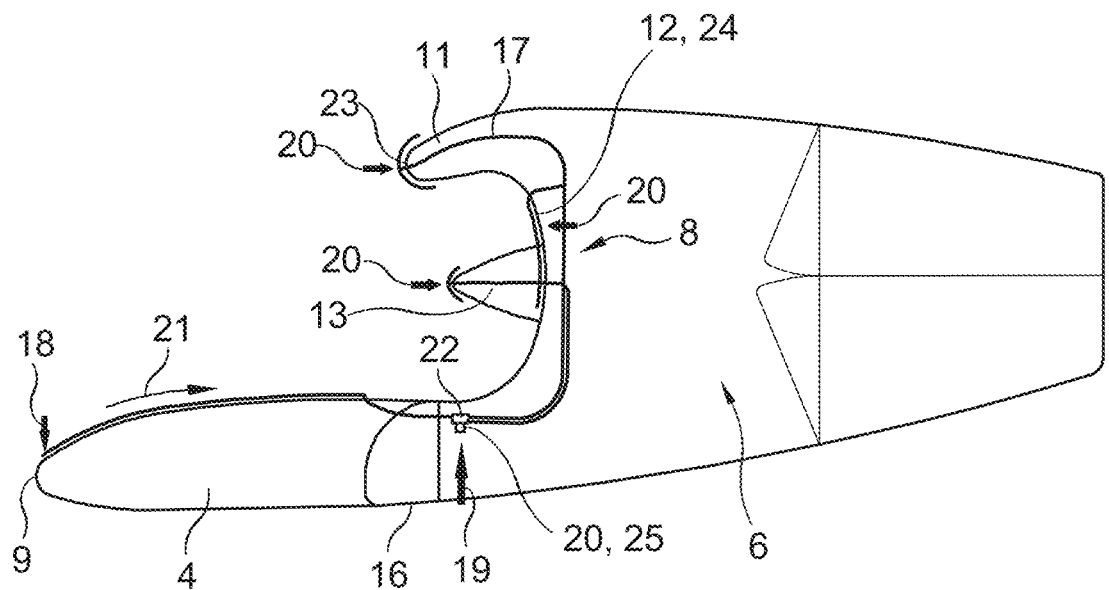
FIG. 2 side-view of a canard of the aircraft shown in FIG. 1 with the ice protection system.

FIG. 2 shows a side view of one of the canards 4 with at least one motor 6 arranged on the trailing edge 16 of the canard 4. The canard 4 and the motor 6 are provided with the ice protection system 8. In particular, the ice protection system 8 is arranged on the canard 4 and on the motor 6 arranged on the trailing edge 16 of the canard 4.

The other canard is designed identical to the canard 4 described here. Furthermore, each wing 3 is also provided with an ice protection system 8, which is constructed similarly/identically to the ice protection system 8 on each canard 4. It is also possible to provide the ice protection system on other airfoils of the aircraft.

The ice protection system 8 uses an ice protection fluid 17, which is applied to the ice-susceptible portions of the aircraft 1. The ice protection system 8 can be operated in a de-icing manner or in an anti-icing manner. The de-icing manner means the removal of preformed ice through the conversion of a thin ice layer on the airfoil surface to water, leading to the remaining pieces being removed due to aerodynamic forces. The anti-icing manner means preventing the incoming super cooled droplets from freezing as the ice protection fluid is reduced in viscosity for easier flow back along the wing with the additional water.

The ice protection system 8 comprises a first applying mechanism 18, which applies the ice protection fluid 17 onto at least a portion of the canard 4 along the leading edge 9 of the canard 4. The ice protection fluid 17 disperses along the canard 4 in a downstream direction, i.e., in the chordwise direction of the canard 4, as shown by arrow 21 in FIG. 2.

The canard 4 is provided with an ice protection fluid recovering mechanism 19 for recovering/collecting the ice protection fluid 17 applied to the leading edge 9 of the canard 4. The ice protection fluid recovering mechanism 19 comprises at least one recovery recess 22 in the surface of the canard 4. The recovery recess 22 can be a continuous recess extending along the spanwise direction of the canard 4 or can be composed of a plurality of smaller recesses arranged side by side along the spanwise direction of the canard. The ice protection fluid 17 traveling along the surface of the canard 4 in a downstream direction as shown by arrow 21 enters into the recovery recess 22 and is collected by the ice protection fluid recovering mechanism 19. The recovery recess 22 can comprise a cover that is open in icing conditions and that is closed in non-icing conditions so that it covers the recovery recess 22 to be flush with the surrounding surface of the airfoil of the aircraft, i.e., the canard 4.

The ice protection system 8 further comprises a second applying mechanism 20. The second applying mechanism 20 applies the ice protection fluid 17 recovered by the ice protection fluid recovering mechanism 19 to further ice-susceptible portions of the aircraft 1 arranged downstream of the trailing edge 16 of the canard 4, namely to the leading edge 23 of the motor flap 11, to the leading edge 24 of the motor bulkhead 12 and to the spinner 13. The second applying mechanism 20 comprises a pump 25, which pumps the recovered ice protection fluid 17 from the recovery recess 22 to the leading edge 23 of the motor flap 11, to the leading edge 24 of the motor bulkhead 12 and to the spinner 13. As described above, the viscosity of the ice protection fluid is reduced during deicing the leading edge 9 of the canard 4. The reduction in viscosity also makes it easier for the pump to move the ice protection fluid to the motor surfaces and the spinner.

The centrifugal force of the spinner 13 is sufficient to spread the ice protection fluid 17 over itself and over the rotor 14 so that the surfaces of the spinner and the rotor are kept ice-free. Therefore, no inter-cycle ice accretion and no concerns about ice thickness effects on the aerodynamics of the rotor blades occur. Preferably, the pump 25 provides a constant flow of ice protection fluid 17 to the spinner 13. Therefore, the spinner 13 and the rotor 14 remain coated with the ice protection fluid 17 and are protected in icing conditions.

The ice protection fluid 17 comprises a freezing point depressant. The freezing point depressant lowers the freezing point of water and ensures that ice does not form on the aircraft surfaces even at subzero atmospheric temperature conditions. Preferably, the freezing point depressant is ethylene glycol. The concentration of the freezing point depressant is sufficient for water impinging on the wing/canard areas when de-icing/anti-icing the leading edges thereof and subsequently on the spinner, bulkhead and flap leading edge due to supercooled droplet impingement.

For VTOL flight, the freezing point depressant ice protection system (FPD IPS) is a viable and mechanically suitable technology for ice protection. The use of a wing recirculation pump mechanism allows the reuse of fluid from the wing leading edge for the ice protection requirements of the spinner, rotor, bulkhead, and flap leading edge. The recirculated fluid is collected through a recess in the airfoil surface that is actuated to open in icing conditions, and otherwise flush with the surface in non-icing conditions to minimize the aerodynamic effect in flight. This saves weight of the total fluid required, and power in comparison to more energy-intensive technologies such as electro-thermal heating.

Some of the potential advantages include a drastic reduction in overall power requirements (otherwise due to active heating on the canard, wing, rotor blades, spinner, flap and bulkhead), sizing for the fluid requirements only for the canard/wing (as fluid is being reused), leading edge protection using FPD is limited to the stagnation zone and would not interfere with the forward spar on the wing, if the ground icing concept pursued would be fluid based then the motors would be qualified to ingest similar fluid in any case, etc.

LIST OF REFERENCE SIGNS 1 aircraft
2 aircraft body
3 wing
4 canard
6 motor
7 winglet
8 ice protection system
9 leading edge of canard
10 leading edge of wing
11 motor flap
12 motor bulkhead
13 spinner
16 trailing edge of canard
17 ice protection fluid
18 first applying mechanism
19 ice protection fluid recovering mechanism
20 second applying mechanism
21 downstream direction
22 recovery recess
23 leading edge motor flap
24 leading edge motor bulkhead
25 pump

What is claimed is:

1. A wing assembly of an aircraft comprising:
an airfoil having a leading edge; and
an ice protection system comprising:
a first applying mechanism disposed at the leading edge of the airfoil and configured to apply an ice protection fluid along at least a portion of the leading edge of the airfoil,
an ice protection fluid recovering mechanism disposed on the airfoil and downstream of the leading edge of the airfoil, the ice protection fluid recovering mechanism configured to recover and collect the ice protection fluid applied by the first applying mechanism, and
a second applying mechanism configured to apply the ice protection fluid recovered and collected by the ice protection fluid recovering mechanism on at least one surface of the wing assembly of the aircraft downstream of the leading edge of the airfoil.

2. The wing assembly according to claim 1, wherein the ice protection fluid recovering mechanism comprises at least one recovery recess arranged on a surface of the airfoil downstream of the leading edge of the airfoil for recovering the ice protection fluid.

3. The wing assembly according to claim 1, wherein the second applying mechanism comprises at least one pump for pumping the ice protection fluid recovered by the ice protection fluid recovering mechanism to the at least one surface of the wing assembly downstream of the leading edge of the airfoil.

4. The wing assembly according to claim 1, wherein the ice protection system is configured to work in an anti-icing mode and/or in a de-icing mode.

5. The wing assembly airfoil according to claim 1, wherein the ice protection fluid comprises a freezing point depressant.

6. The wing assembly airfoil according to claim 5, wherein a concentration of the freezing point depressant in the ice protection fluid is adapted so that the ice protection fluid keeps its ice protection properties after having treated the leading edge of the airfoil of the aircraft.

7. The wing assembly according to claim 1, further comprising at least one motor disposed at a trailing edge of the airfoil, wherein the second applying mechanism applies the ice protection fluid recovered by the ice protection fluid recovering mechanism along at least a portion of leading edges of the at least one motor.

8. The wing assembly according to claim 7, wherein each motor comprises a spinner and the second applying mechanism is configured to deliver the recovered ice protection fluid onto the spinner, and the spinner is configured to spread the ice protection fluid onto a rotor.

9. The wing assembly according to claim 8, wherein the second applying mechanism is configured to apply a constant flow of ice protection fluid to the spinner.

10. The wing assembly according to claim 7, wherein each motor comprises a motor flap and a bulkhead and the second applying mechanism is configured to distribute the ice protection fluid recovered by the ice protection fluid recovering mechanism onto at least a portion of the motor flap and the bulkhead of each motor.

11. An aircraft comprising the wing assembly according to claim 1.

12. The aircraft according to claim 11, wherein the airfoil is in the form of a wing or in the form of a canard.

13. The aircraft according to claim 11, wherein the aircraft is an electric takeoff and landing aircraft.

14. A method of protecting a wing assembly of an aircraft from ice, the method comprising:
  applying an ice protection fluid on a leading edge of an airfoil;
  recovering the ice protection fluid on the airfoil downstream of the leading edge of the airfoil;
  collecting the recovered ice protection fluid in the airfoil downstream of the leading edge of the airfoil; and
  distributing the recovered ice protection fluid on at least an area of the airfoil wing assembly arranged downstream from the leading edge of the airfoil.

15. The wing assembly according to claim 1, wherein the ice protection fluid recovering mechanism is disposed completely on the wing assembly.

* * * * *

UNITED STATES PATENT AND TRADEMARK OFFICE
CERTIFICATE OF CORRECTION

PATENT NO. : 12,384,545 B2
APPLICATION NO. : 18/165670
DATED : August 12, 2025
INVENTOR(S) : Ayaz Janjua Zaid and Matthias Haisch It is certified that error appears in the above-identified patent and that said Letters Patent is hereby corrected as shown below:

In the Claims

| | | | |
|---|---|---|---|
| Claim 5, | Column 8, | Line 62, | change "wing assembly airfoil according to" to --wing assembly according to-- |
| Claim 6, | Column 8, | Line 65, | change "wing assembly airfoil according to" to --wing assembly according to-- |
| Claim 14, | Column 10, | Line 16, | change "area of the airfoil wing assembly" to --area of the wing assembly-- |

Signed and Sealed this
Thirtieth Day of September, 2025

John A. Squires
*Director of the United States Patent and Trademark Office*